July 26, 1938.   F. M. CASE   2,124,524
AUTOMATIC FISHING REEL
Filed April 11, 1935   4 Sheets-Sheet 3

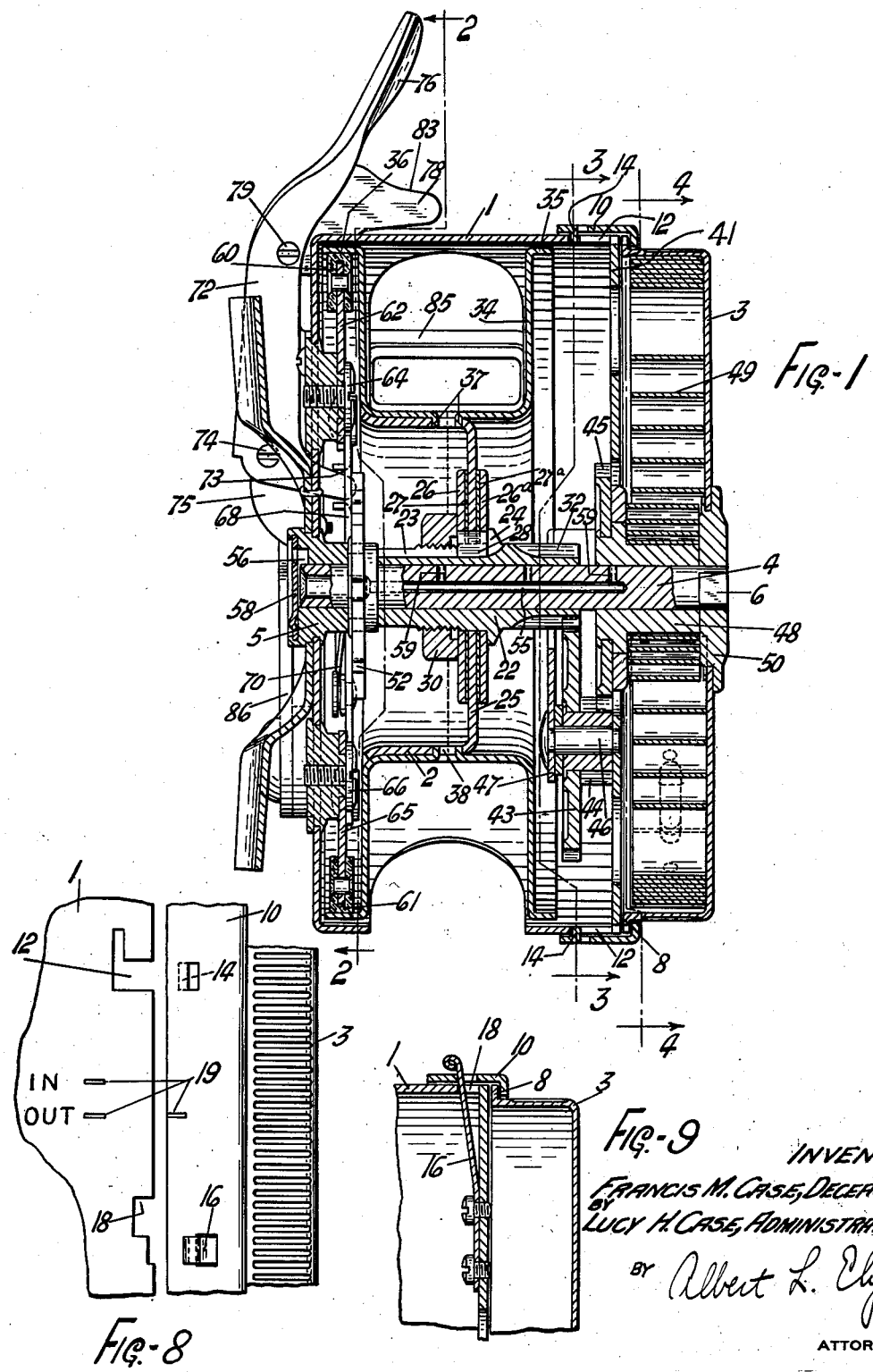

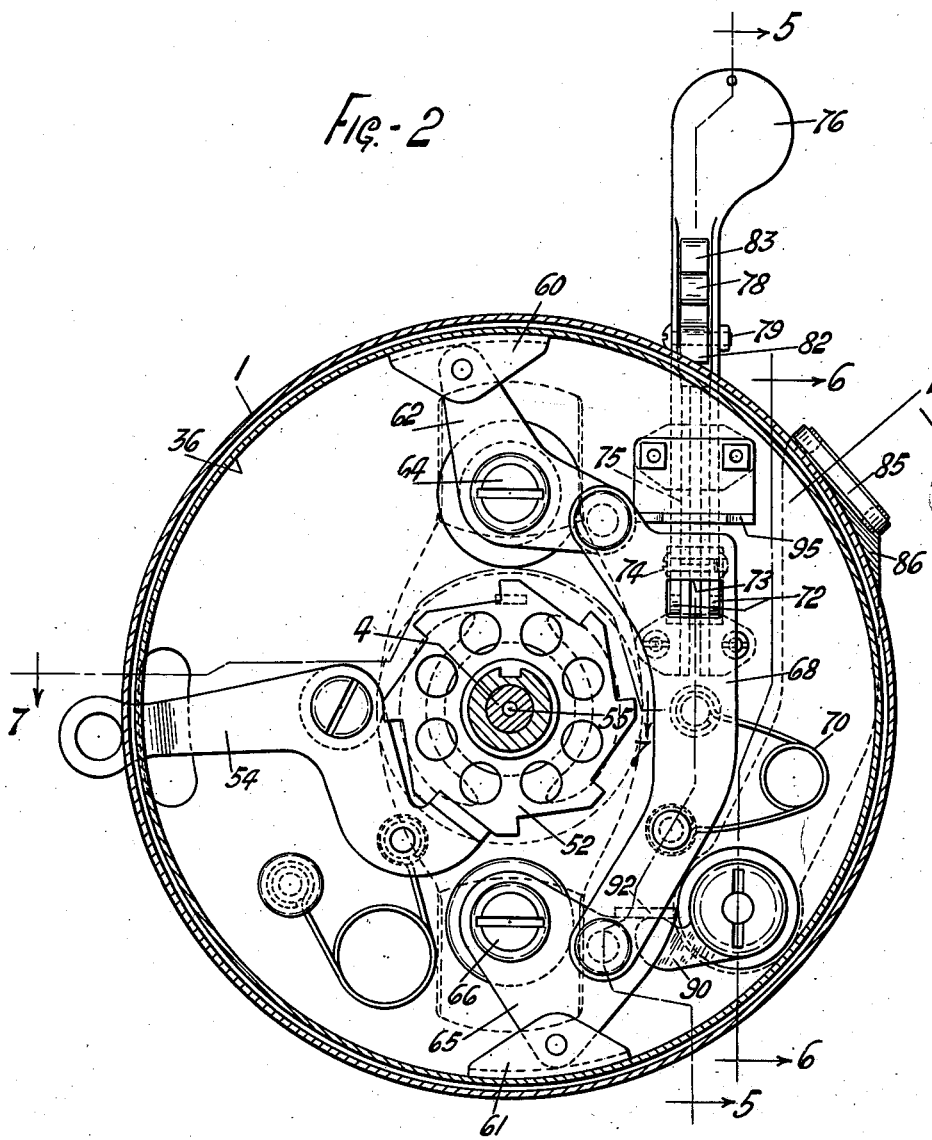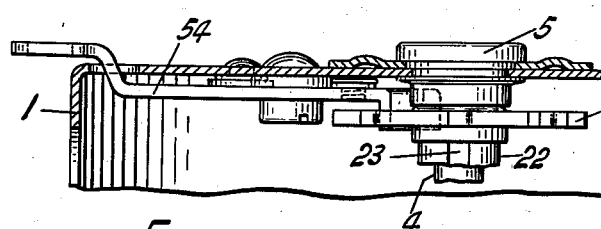

INVENTOR
FRANCIS M. CASE, DEC'D
BY LUCY H. CASE, ADMINISTRATRIX
BY Albert L. Ely
ATTORNEY July 26, 1938.    F. M. CASE    2,124,524
AUTOMATIC FISHING REEL
Filed April 11, 1935    4 Sheets-Sheet 4

INVENTOR
FRANCIS M. CASE, DEC'D
BY LUCY H. CASE, ADMINISTRATRIX

BY    Albert L. Ely

ATTORNEY

UNITED STATES PATENT OFFICE 2,124,524

AUTOMATIC FISHING REEL

Francis M. Case, deceased, late of Cleveland, Heights, Ohio, by Lucy H. Case, administratrix, Cleveland Heights, Ohio, assignor to The Enterprise Manufacturing Company, Akron, Ohio, a corporation of Ohio Application April 11, 1935, Serial No. 15,809

12 Claims. (Cl. 242—84.3)

The present invention relates to fishing reels and particularly to that type of reel which is designated in the art as "automatic." A reel of this type is equipped with line retrieving mechanisms, usually in the form of a coil spring which is attached to the spool.

It is the object of the present invention to improve upon this form of reel in a number of particulars, as will be set forth herein.

Reels of this type are usually provided with a spring-resisting brake lever which bears against the side of the spool, but the lateral pressure of the brake tends to cramp the spool on the post or shaft. One of the objects of the invention is to provide a new form of brake mechanism which will apply the brake in balance and in such manner that the spool will be maintained in correct position on the shaft. This also involves a new and novel form of brake device.

In this type of reel, it is the practice, due to the design of the reel, to depress the brake lever when the line is being stripped preparatory to making a cast. The present reel is provided with a line guiding device which is connected to the brake mechanism so that as the line is stripped in the proper way the brake is thereby released. This simplifies the stripping of the line and obviates the necessity of operating the brake by hand during this operation.

A further object of the invention is to improve upon means for holding the brake out of engagement with the spool while the spring is active. Various devices have been designed to accomplish this purpose, but the invention improves upon this feature.

The reel is also designed so that it can be easily disassembled for repairs or oiling. Reels of this type have heretofore been difficult to take apart. By providing an improved construction to facilitate the separation of the reel, the device is improved.

The spool has also been improved in construction and design and the facilities for oiling the reel.

These and other objects and advantages will be evident from the detailed description of the construction and operation of the reel, it being observed, however, that the description is of the best known or preferred form of the invention and is not intended to limit the same to exact conformity with those details, but may be embodied in other forms or improved and modified within the scope of the invention.

In the drawings:

Figure 1 is a cross-section through the reel taken along the shaft or post;

Figure 2 is a section on the line 2—2 of Figure 1 which discloses the mechanism on the back plate of the reel, the brake being shown in its "on" position;

Figure 7 is a section on the line 7—7 of Figure 2 showing the pawl; and

Figures 8 and 9 are details of the "take-apart" device, the latter view being on the line 9—9 of Figure 3.

Figure 3:
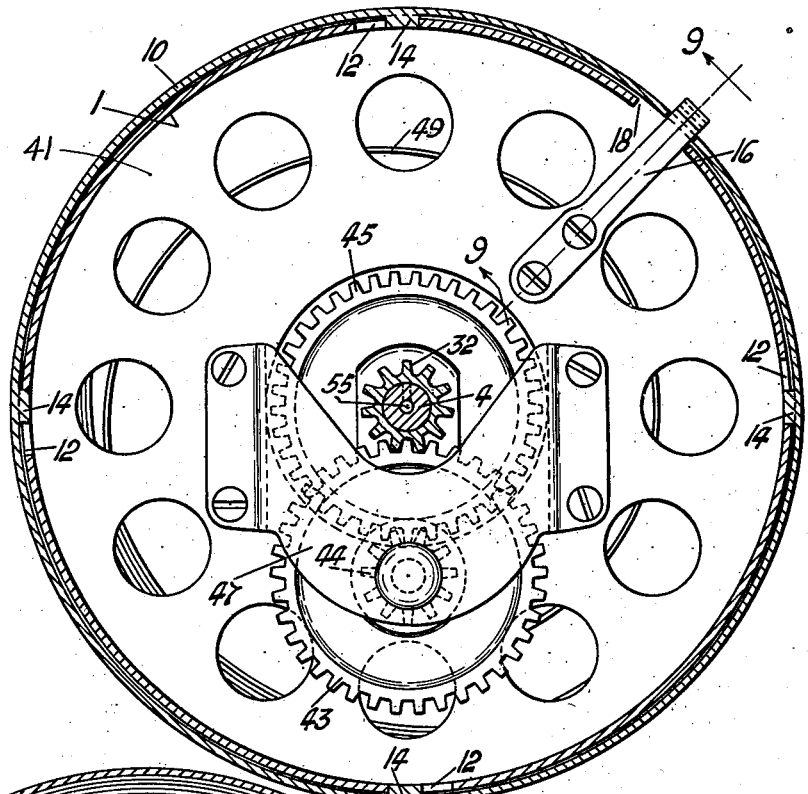
Figure 3 is a section on the line 3—3 of Figure 1, showing the gearing between the spring and the spool and the locking ring for holding the several parts of the reel in assembled condition.
Figure 4:
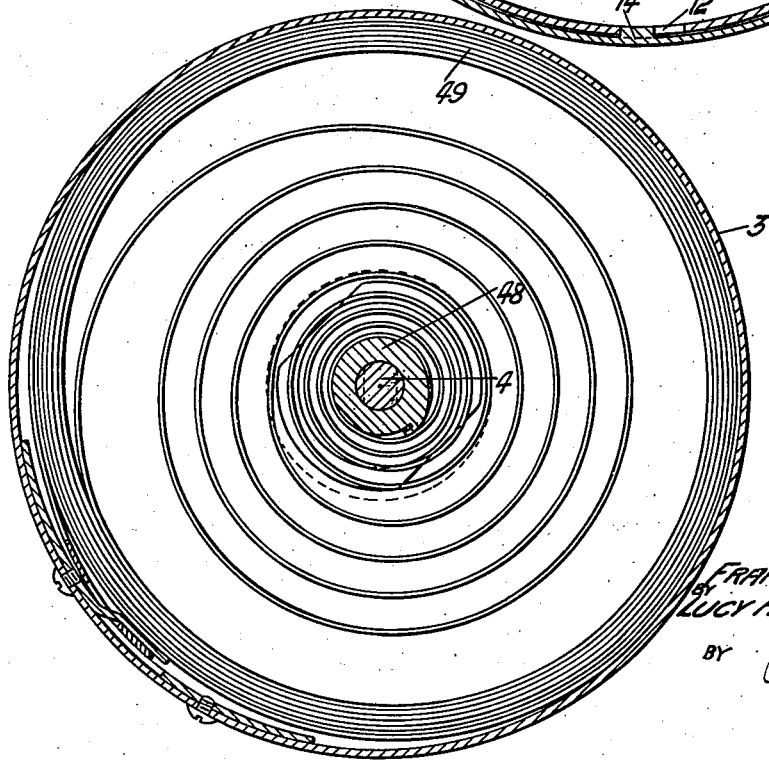
Figure 4 is a section through the spring drum or housing on the line 4—4 of Figure 1.

The reel is made in three main portions which are separable when the locking mechanism, which holds the parts together, is released. The back plate or main housing, indicated generally by the numeral 1, is formed with the housing which surrounds the spool and is provided with the openings through one of which the line passes. The back plate carries the brake lever and its associated parts. The spool is indicated by the numeral 2 and the front plate or spring housing and drum by the numeral 3.

The shaft upon which the spool is mounted is indicated by the numeral 4, being seated at its inner end in a bearing 5 on the back plate, the other end projecting into the front plate where it is squared off at 6 to form a driving connection with the front plate and thus to the spring.

The spring drum 3 is formed with a flange 8 about which is loosely mounted the flanged locking ring 10, the outer surface of which is turned over to engage the flange 8. The outer edge of the housing 1 is provided with bayonet notches 12 and the ring with tongues 14 struck out from the metal of the ring, the tongues being adapted to enter the angular notches so that when the ring is rotated the parts will be held together in assembled position. A spring locking tongue 16 is secured to the inside of the spring drum and passes through the ring to form a latch, engaging, for this purpose, a deep notch 18 in the edge of the housing 1. Indicating marks 19 are provided on the ring and housing to denote the locked and unlocked positions. To take the reel apart for cleaning, oiling, or inspection, it is necessary merely to turn the ring to disengage the tongues 14 and the notches 12, whereupon the spring drum may be removed. This releases the spool and the shaft and exposes all of the operative parts of the reel.

The construction of the spool has been greatly improved. It consists of a central barrel or tube 22 which is rotatably mounted upon the shaft and is formed with a keyway 23 and an abutment in the form of a shoulder flange 24. The spool is made from a central disk 25 flanged about its outer periphery and held to the barrel by two locking rings 26 and 26ª on either side of the disk, between which and the disk are located two friction rings 27 and 27ª. A key 28, seated in the keyway, locks the disk and the rings to the barrel, the assembly being held against the shoulder 24 by the nut 30. The barrel 22 is provided on the side adjacent the spring drum with a gear formation 32. To the outer flange on the central disk 25 is riveted the channel-shaped line-receiving member 34, the outer edges of the member being formed with flanges 35 and 36. The channel-shaped member 34 is made of two sections 34ª and 34ᵇ divided along the central plane of the spool, the sections being held by pressing tongues 37 downwardly from their adjacent edges into openings 38 formed on the disk 25. The inner flange 36 is somewhat deeper, being adapted to receive the force of the braking devices to be later described. This spool construction is light and inexpensive to manufacture, but is rigid enough for the purposes.

The gear 32 meshes with the gear 43 with which is formed the smaller pinion 44 meshing with the ring gear 45. The gear 43 is mounted on a post 46 carried in a spring cover plate 41, the latter having a bridge piece 47 thereon.

Gear 45 is fixed to a sleeve 48 rotatably mounted in the spring drum and loosely received over the shaft 4 when the parts are assembled. The coil spring 49 is secured at its inner end to the sleeve 48 and at its outer end to the housing 3. The housing 3 has the central plate 50 which is in driving connection with the shaft 4, as has been described.

Fixed to the inner end of the shaft 4 is the ratchet disk 52, the teeth of which are engaged by the spring operated, pivoted pawl 54 mounted on the back plate (Figures 2 and 7). The spring 49 is wound up by rotation of the drum 3, the pawl holding one end of the spring through the agency of ratchet 52, shaft 4, and sleeve 48, while the unwinding of the spring is resisted by the spool 2 through the agency of brake means presently to be described.

The shaft 4 is provided with a central oiling bore 55 which opens on the inner side of the reel in a chamber 56 formed in the bearing 5. A rotary shutter 58 may be turned to admit oil to the chamber and thence to the central bore. Lateral passages 59 conduct the oil to the outer surface of the shaft, both at the spool barrel and to the spring sleeve 48, the rotating parts being thus easily lubricated at a single oiling.

The brake mechanism, which checks the rotation of the spool under the influence of the coil spring, is shown principally in Figure 2, the construction shown being arranged for braking a spool that is spring-driven in clockwise direction as viewed in said figure. Against the inner circumference of the flange 36 are located the two brake shoes 60 and 61 which, as shown, are on opposite sides of the spool axis so that the braking effect is balanced. One brake shoe 60 is pivoted on the end of the bent lever 62 which rocks upon the pin 64 mounted in the back plate. The other brake shoe 61 is pivoted on the triangular plate 65 which rocks on the pin 66 also mounted in the back plate. Connecting the parts 62 and 65 is the link 68 by which the two brake shoes are simultaneously operated. The link 68 is urged in the direction to apply the brakes to the spool by the spring 70, one end of which is attached to the back plate and the other to the link.

It will be seen that the mounting of the brake shoes and the application of the brake are superior to the usual constructions in which the brake bears against the side of the spool. As these brakes are constructed and operated, the pressure is equalized and balanced and there is no tendency, as in former constructions, to tilt the spool on its shaft. This makes a superior construction and one which will outlast the former devices as the spool tends to rotate truly as the braking force is relaxed. It will also be observed that the arms which carry the brake shoes are not in the full radial positions when the brake shoes are applied, and that said arms and the brake shoes pivotally mounted thereon constitute toggles whereby strong braking pressure is obtained. In the braking operation the force of spring 70 is supplemented by friction of the spool on the brake shoes whereby the latter are urged into wedging relation with the spool flange, by reason of their toggle-like mountings. The arrangement also assures that the brakes will release easily when it is desired to strip the fish line.

The link 68 is actuated to release the brakes by means of a brake release lever 72, the inner end of which projects through the back plate and into an opening 73 struck into the metal of the link. This lever is pivoted near its inner end on a pin 74 supported in a bridge piece 75 secured to the back plate. The outer end of the lever is bent outwardly to form an operating extension 76 which projects beyond the reel housing. The central arm of the lever is channeled, and in this channel is located the latch or dog 78 by which the lever may be locked in brake release position so as to permit the free action of the coil spring in reeling in the line.

Figure 5:
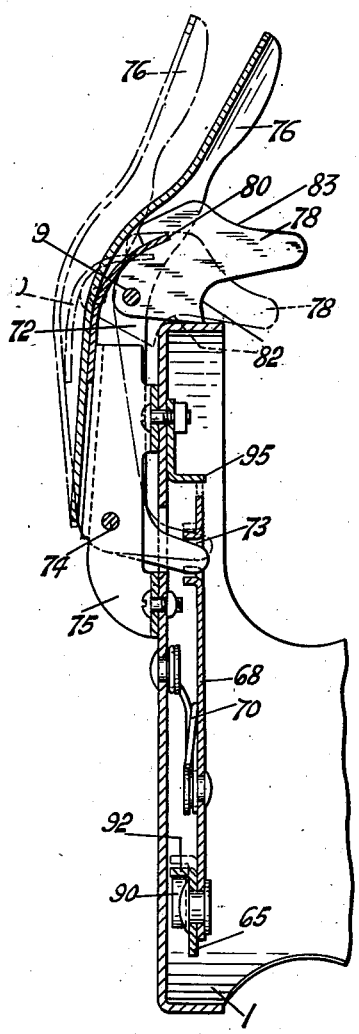
Figure 5 is a section through the brake lever, being taken on the line 5—5 of Figure 2.
Figure 6:
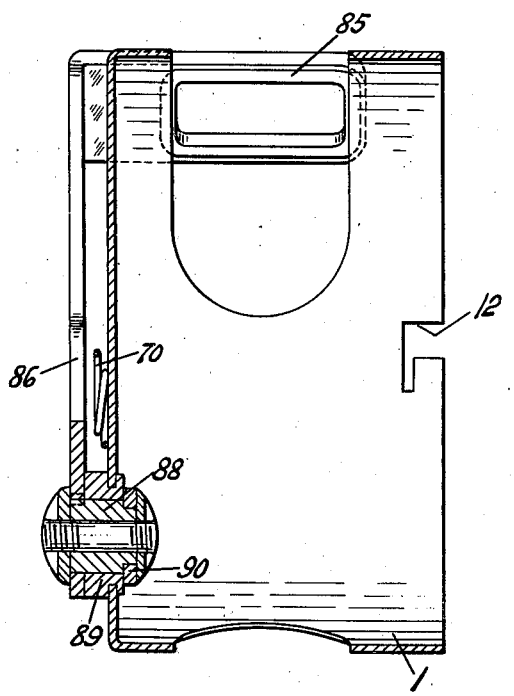
Figure 6 is a section on the line 6—6 of Figure 2, showing the pivoted line guide and brake release lever.

The latch 78 is formed in the shape shown in Figure 5 and is pivoted on the lever 72 by the pin 79, being urged away from the reel housing by the leaf spring 80, one end of which is secured in the base of the lever and the other in a notch in the latch. On the side of the latch adjacent the housing is formed the curved shoulder 82 and on the outer side of the latch is formed the curved bearing surface 83.

Two positions of the brake release lever and latch are shown in Figure 5, that in full lines being the position while the brakes are applied and, in dotted lines, the position when the brakes are released and the lever locked in that position. It will be noted that the spring 70 tends to hold the lever in full line position.

When the brakes are to be released to permit the action of the spring, the fisherman may press upon the outer end of the arm whereby he can control the rotation of the spool under the action of the spring. If, however, he wishes to give the spring free play, he presses upon the surface 83 which rocks the lever and at the same time rocks the latch to bring the shoulder 82 beneath the edge of the reel housing, as shown in dotted lines, where the mechanism is locked by the tendency of the lever to return to full line position. When, however, the fisherman desires to apply the brake again, all that is required is to press on the outer end of the lever whereupon the latch moves outwardly and the lever will return to its normal position. This makes an easy method of operation for locking or releasing the brake actuating lever.

In the usual automatic reel construction, while the line is being stripped the fisherman has to release the brake with each stripping movement and restore the brake in the intervals of stripping. This new reel provides means whereby the brake is automatically released during stripping and reapplied during the intervals. This result is secured by the provision of a supplementary brake release lever which is responsive to the manipulation of the line in stripping.

The line L, indicated in Figure 2, passes through an opening in the lateral arm 85 which is a part of the supplementary brake release lever 86 which is keyed to a sleeve 88 rotatable in a bearing 89 on the back plate. The sleeve 88 is fixed at its inner end to an arm 90, the end of which normally rests against a flange 92 on the pivoted plate 65. In stripping the line, the fisherman draws it down in the direction of the arrow in Figure 2 which rocks the lever 86 outwardly, moving plates 65 and 62 through the link 68 to the position which releases the brake shoes 60 and 61. When the fisherman releases the line, the parts are returned to their former position and the brakes reapplied, thus preventing the spool from rotating to draw in the slack. When the fisherman is preparing to make a cast, this mechanism not only makes the withdrawal of the line easier, but preserves the slack as it accumulates. A stop 95 is provided to limit the movement of the link 68 in the brake release direction.

While the various features of the invention have been described in connection with "automatic" reels, it is evident that certain elements of the invention may be employed in other types of reels. It is also evident that the particular design and details of the reel shown are not essential and may be varied.

Wherein, in the claims, reference is made to "automatic" reels, it will be understood that this refers to the type of reel in which the spool is arranged to be rotated by spring tension, usually exerted by a coil spring connected to the spool to rotate it in line-winding direction.

What is claimed is:

1. In an automatic reel, the combination of a housing, a rotatable spool therein formed with a concentric flange thereon, an arm pivotally mounted at a fixed point upon said housing and having its free end disposed adjacent said flange, a brake shoe supported solely by a pivotal connection upon the free end of said arm, and means for moving the arm in the direction to wedge the brake shoe between the said flange and the free end of said arm.

2. In an automatic reel, the combination of a rotatable spool formed with a concentric flange thereon, a pair of arms pivotally mounted upon fixed points on opposite sides of the axis of the spool and having their free ends disposed adjacent said flange, respective brake shoes supported solely by pivotal connections upon the free ends of said arms, and a single yielding means normally urging both said arms in the directions to wedge the brake shoes between the ends of their arms and the spool flange.

3. In an automatic reel, the combination of a rotatable spool having a concentric flange thereon, a torsion spring normally urging said spool to rotation in a determinate direction, an arm pivotally mounted upon a fixed point and extending toward said flange in non-radial relation thereto, and a brake shoe pivotally carried by said arm, beyond the free end thereof, and engageable with said flange, said arm being so disposed with relation to the spool flange that rotation of the latter under impetus of the torsion spring will urge the brake shoe engaged therewith to movement in the direction that carries the said arm toward radial relation to said flange, with resultant binding of the brake shoe between said flange and the free end of said arm.

4. In an automatic reel, the combination of a spool, a lever pivoted on the reel, a line guide carried by the lever, a pair of movable brake shoes normally bearing against diametrically opposite regions on the spool, a manually operated lever, and connections between both said levers and the brake shoes whereby the latter may be released concurrently by the operation of either lever selectively.

5. In an automatic reel, the combination of a spool, a movable line guide carried by the reel, a pair of brake shoes normally bearing against local regions on opposite sides of the axis of the spool, a manual release lever having operative connection with said brake shoes, and connections between the line guide and the lever whereby the brake shoes may be released concurrently by said elements selectively.

6. In an automatic reel, a spool having a peripheral flange, movable brake shoes yieldingly held against the flange and located on opposite sides of the spool axis, respective supporting means for said brake shoes, a link connecting the brake shoe supporting means, and a manually operated lever for moving the link.

7. In an automatic reel, a spool having a peripheral flange, movable brake shoes yieldingly held against the flange and located on opposite sides of the spool axis, respective supporting means for said brake shoes, a common operating link connecting the brake shoe supporting means, and a manually operated lever and a line operated lever for moving the link.

8. In an automatic reel, the combination of a reel housing, a spool in the housing, a brake for the spool, an operating link connected to said brake, a brake release lever pivoted to the housing and connected to said link, and a pivoted latch on the lever having a shoulder receivable beneath the housing, a spring connected to a fixed point and to said link for forcing the lever toward the housing, and a second spring between the release lever and latch to move the latch into release position, the lever being movable in the direction to release the brake by pressure applied directly to the lever or to the latch.

9. In an automatic reel, the combination of a reel housing, a spool in the housing, a brake for the spool, a brake release lever pivoted to the housing and a latch pivoted to the lever, said latch having a shoulder movable beneath the housing and a spring normally tending to rock the latch away from the housing.

10. In an automatic reel, a back plate and a spring drum, a shaft having bearings in the back plate and the drum, a spool over the shaft and a passageway for oil in the shaft and communicating with the bearings on either end thereof and having lateral passageways leading to the interior of the spool, and a shuttered chamber at one end of the shaft to receive oil.

11. In an automatic reel, a back plate and a spring drum, a shaft having bearings in the back plate and the drum, a spool over the shaft, and a bore within the shaft and opening into a chamber in the back plate and having lateral passages to the inner surface of the spool and into the drum bearing.

12. In an automatic reel, the combination of a rotatable spool having a concentric flange thereon, a torsion spring normally urging said spool to rotation in a determinate direction, a pair of arms pivotally mounted at fixed points on opposite sides of the axis of the spool and extending toward said flange in non-radial relation thereto, respective brake shoes pivotally carried upon the said arms, beyond the free ends thereof, a spring common to said arms for urging both of them in the direction to engage the brake shoes with the flange, said arms being so positioned with relation to the spool flange that rotation of the latter under impetus of the torsion spring will urge the brake shoes engaged therewith to movement in the direction that carries the said arms toward radial relation to said flange, and as a result to wedge said brake shoes between said flange and the free ends of said arms, and manually operable means for swinging said arms concurrently in the direction to retract the brake shoes from the spool-flange.

LUCY H. CASE,
*Administratrix of the Estate of Francis M. Case, Deceased.*